United States Patent Office
2,773,002
Patented Dec. 4, 1956

2,773,002
PURIFICATION OF LACTASE ENZYME AND SPRAY-DRYING WITH SUCROSE

William M. Connors, Bay Shore, and Theodore Sfortunato, Patchogue, N. Y., assignors to National Dairy Research Laboratories, Inc., Islip, N. Y., a corporation of Delaware No Drawing. Application March 31, 1955, Serial No. 498,434

7 Claims. (Cl. 195—63)

This invention relates to a process for the isolation and purification of lactase enzyme from lactase yeasts and to the product of the process.

The lactase enzyme of the present invention is one which has a high stability, a high activity, and excellent flavor when used in milk products. This enzyme has a molecular weight of about 100,000 or less. It can not be boiled.

A lactase enzyme may also be prepared from *Escherichia coli* as described in Cohn and Monod, Biochem. Biophys. Acta., volume 7, pages 153–174, May 1951; Monod et al., Compt. rend., volume 227, pages 315–316 (1948); O. F. Landman, Yale Pharmacal Review, pages 39 to 66 and 200 to 207 (1951); and Lester, thesis, Ph. D., Yale University, 1951, pages 81–86. However, the lactase enzyme described in these articles is different from that of the present invention since it is thought to have a molecular weight of the order of 800,000 and may be boiled.

Various methods have been proposed in the prior art for the isolation and purification of lactase enzyme. In the Van Dam et al. article, Netherlands Milk Dairy Journal, volume 4, pages 96–114 (1950), there is set forth an extraction of lactase from yeast after the rupture of these cells with chloroform or water. The extracted enzyme is then precipitated by the addition of alcohol to the extract solution. The lactase enzyme prepared by this process, however, has a poor flavor when used with milk products.

Waksman et al., Enzymes, pages 183–184 describes macerating yeast with chloroform, diluting with water and neutralizing with ammonia to recover a lactase solution. However, the use of chloroform in this process results in the inactivation of the lactase enzyme.

The British Patent 474,822, to Horter discloses extraction of enzymes from yeast cells using chloroform, toluene, or the like by autolysis at about 40° C. This process, however, results in an enzyme which has been inactivated and which has a poor flavor when used with milk products. The use of toluene in small amounts, however, as a preservative in an extraction process is satisfactory.

In the Lester thesis mentioned above there is described a process for the liberation of lactase from *Escherichia coli* by mechanical disruption of the cells in a saline medium and the extracted material is subjected to acetone fractionation, the enzyme obtained at a critical level of acetone being then dissolved in a phosphate buffer and further purified by ammonium sulfate fractionation. This process is relatively complicated and would not be suitable for a commercial operation involving the purification of lactase enzyme from lactase yeasts.

Myrback et al., Z. Physiol. Chem., volume 277, page 171 (1943), describes fermentation of lactose with yeast extracts, but there is no indication as to how the lactase enzyme can be separated.

In general, the process of this invention comprises the following steps. First, the lactase yeast cells must be disrupted to make the lactase enzyme available for extraction. This disruption may be accomplished by several methods. One of these methods is to place a wet yeast cake plus sand in an agitator such as a rotary drum. The sand will abrade and disrupt the yeast cake. It is preferred, however, to disrupt the lactase yeast cells by drying the yeast cake.

The dried lactase yeast cake is placed in an aqueous solution containing a small amount of toluene as a preservative. The aqueous solution of toluene also contains a potassium phosphate buffer consisting of potassium monohydrogen phosphate and potassium dihydrogen phosphate. The buffer is used to adjust the pH of the solution within a range of about 6.5 to 7.2. The extraction is carried out at about 25° C. to 40° C. or below and is complete in approximately 4 to 20 hours. A 5% to 15% slurry of the yeast in the phosphate buffer gives a desirable extraction. These conditions of concentration, pH, time and temperature are very critical to the process of this invention.

The extracted lactase is then separated from the debris by centrifugation. The centrifugate containing the lactase is cooled to a temperature of approximately 40° F. or below in a chilled tank and acetone at 40° F. added thereto until the acetone concentration is about 40 to 50% by weight in order to precipitate the lactase containing material. The precipitation is essentially complete in about two hours. The precipitated lactase is separated by centrifugation.

The lactase containing material is dissolved in water. This material is then centrifuged and to the centrifugate containing approximately 8% total solids there is added a sucrose carrier to bring the final solids content thereof to about 12% to 20%. The final solids content may be adjusted within this range depending upon the lactase activity desired in the finished product. The lactase-sucrose dispersion is then spray dried. This use of spray drying with a sucrose carrier has been found to be particularly advantageous as noted below.

The preferred embodiment of the invention will be described in further detail in connection with the accompanying flow sheet.

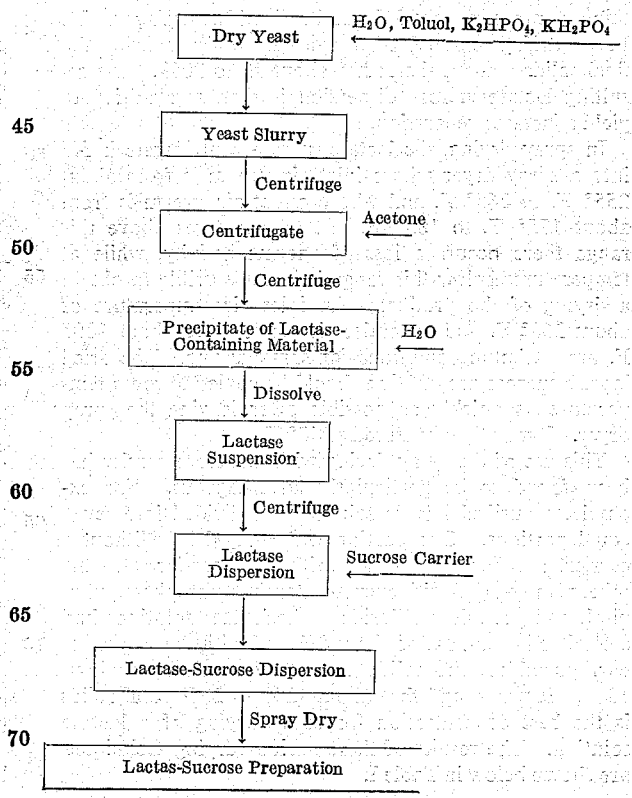

A lactase yeast, for example, *Saccharomyces fragilis* or *Torulopsis sphaerica*, wherein the cells have been disrupted by drying, is placed in a suitable agitator, such as a rotary drum, and agitated therein with a mixture of water, toluol, and a potassium phosphate buffer. The toluol is added in a small amount and serves as a preservative. The phosphate buffer consists of potassium monohydrogen phosphate and potassium dihydrogen phosphate and is used in the mixture to adjust the pH thereof within a critical range of about 6.5 to 7.2. The use of another alkali phosphate as a buffer, namely sodium monohydrogen phosphate and sodium dihydrogen phosphate, is undesirable because such a buffer may result in lower lactase activity. The extraction is carried out at about 25° C. to 40° C. or below and is complete in approximately 4 to 20 hours. The use of lower temperatures results in much slower extraction while the use of higher temperatures results in inactivation of the lactase enzyme. A 5% to 15% slurry of the yeast in the phosphate buffer, and preferably a 10% slurry, gives a desirable extraction.

After the extraction is complete, the yeast slurry is centrifuged to remove the yeast cells and other debris and to obtain a centrifugate containing lactase enzyme. If necessary, the centrifugations may be repeated to obtain a clarified centrifugate. It has been found that the unextracted materials cannot be separated from the lactase extract by means of a filter press. In centrifugations the yeast slurry should not have a total solids content in excess of 15% since this results in difficult centrifugation. The centrifugate is cooled to a temperature of approximately 40° F. or below in a chilled tank and acetone at 40° F. added thereto until the acetone concentration is about 40 to 50% by weight in order to precipitate the lactase containing material. This precipitation of lactase is complete in approximately 2 hours. A treatment with acetone for periods longer than 36 hours results in severe inactivation of the lactase enzyme. The lactase may be separated by centrifugation.

The precipitate containing lactase is then dissolved in water in a suitable tank. This lactase suspension containing approximately 8% total solids is centrifuged. To the centrifugate is added a sucrose carrier to bring the final solids content thereof to about 12 to 20%. The resulting lactase-sucrose dispersion is then spray dried to yield a lactase preparation.

In spray drying, the lactase-sucrose centrifugate is fed into a spray dryer whose inlet air stream is from about 255° F. to 265° F. and whose outlet air stream is from about 175° F. to 185° F. At temperatures above this range there occurs a loss of enzyme activity, while at temperatures below this range it is not possible to obtain a drying of the product. An inlet air temperature of about 260° F. and an outlet air temperature about 180° F. are optimum conditions for spray drying. The dried lactase-sucrose preparation should be cooled to room temperature as quickly as possible after leaving the spray dryer. It may then be stored at 40° F.

This use of the spray drying with a sucrose carrier has been found to be particularly advantageous. For example, a purified lactase solution was divided into seven equal portions. One portion was spray-dried without a carrier, another freeze-dried without a carrier, and the others spray-dried with sucrose, starch, a phosphate, mannitol, and potassium chloride. The lactase solutions had a total solids content of about 8% and with the respective carriers added, the solids content was raised to about 13%. It was found that about 12% to 20% total solids is the best concentration for spray drying of a lactase solution. The results of these various drying techniques are shown below in Table I.

TABLE I.—SOLIDS AND LACTASE UNIT YIELD OF DRIED ENZYME

| Type of Drying | Carrier (160 g. carrier with approx. 80 g. lactase) | Total Available Material Solids (grams) | Total Solids Recovered (grams) | Lactase Activity, Units/gram [1] | Total Lactase Units [2] |
| --- | --- | --- | --- | --- | --- |
| Freeze Drying | None | 80 | 80 | 1,273 | 101,840 |
| Spray Drying | do | 80 | 0 | 0 | 0 |
| Do | Mannitol | 240 | 0 | 0 | 0 |
| Do | Phosphate | 240 | 128 | 310 | 39,680 |
| Do | KCl | 240 | 64 | 580 | 37,120 |
| Do | Starch | 240 | 73 | 781 | 57,013 |
| Do | Sucrose | 240 | 131 | 874 | 114,494 |

[1] Accuracy within 10%.
[2] Obtained by multiplying total solids recovered by lactase activity units/gram.

In the above table the total possible yields were 335,000 units of lactase and 80 grams of enzyme alone and 240 grams of enzyme plus the carrier. The percent recovery for the most striking cases is presented below in Table II.

TABLE II.—PERCENT RECOVERY OF LACTASE AND SOLIDS

| Type of Drying | Carrier | Percent Solids Recovery | Percent Lactase Recovery |
| --- | --- | --- | --- |
| Freeze | None | 100 | 34 |
| Spray | do | 0 | 0 |
| Do | KCl | 26 | 11 |
| Do | Sucrose | 54 | 34 |

From an inspection of Tables I and II above it is seen that absolutely no enzyme product was obtained by spray drying in the absence of a carrier. The use of mannitol as a carrier also resulted in no recovery. While the use of a phosphate, potassium chloride, and starch as carriers resulted in a recovery of the lactase enzyme, the lactase activity of these preparations was low. The use of freeze drying and spray drying with a sucrose carrier gave good results. In both instances the lactase recovery was 34%. In the case of freeze drying without a carrier the total lactase units was 101,840. The use of spray drying with a sucrose carrier resulted in higher total lactase units, namely 114,494. However, an assay check on unitage per gram of protein nitrogen in the freeze-dried product and the spray-dried product using a sucrose carrier gave the following results shown in Table III.

TABLE III.—UNITAGE PER GRAM OF PROTEIN NITROGEN

| Dried Product | Lactase Units per gram of Protein Nitrogen |
| --- | --- |
| Freeze | 16,800 |
| Spray with sucrose | 35,500 |

Table III shows that the sucrose protein is much more active for lactase on the protein nitrogen basis. This indicates that the lactase-sucrose spray-dried preparation was stabilized much more than the freeze-dried lactase preparation.

Thus, it is seen that the lactase preparation containing a sucrose carrier which is formed by spray drying has high activity and good stability as shown by Tables I and III. In addition, the spray-dried lactase-sucrose preparation has superior flavor in milk products. In spray drying, the undesirable yeast flavor which apparently is volatile is lost, but not in other drying techniques. The lactase-sucrose preparation of this invention has a higher activity initially and a greater stability than a commercial lactase-sucrose preparation now on the market.

The lactase-sucrose preparation of this invention may be used in the process disclosed in the Edwin G. Stimpson Patent 2,681,858, issued June 22, 1954. In this patent it is disclosed that the utilization of milk products in concentrated form has been limited heretofore by the low solubility of lactose in water. For example, skim milk cannot be stored if it is concentrated beyond a total solids content of 30%, for at higher concentrations large lactose crystals quickly are deposited. Similarly, there is an upper limit of solids concentration of both whole milk and whey beyond which lactose crystallization becomes a problem. Also, in the manufacture of ice cream the amount of milk solids-not-fat must be within the range from 10 to 10.5%, for at higher proportions lactose will crystallize on storage and produce a so-called "sandy" ice cream.

Crystallization of lactose is a serious problem, because it upsets the uniformity of the product and makes the product difficult to handle when used. The problem is further complicated by the difficulty experienced in redissolving lactose once it has crystallized.

For this reason, it has been proposed in the prior art that the lactose present in milk be hydrolyzed to the simple sugars glucose and galactose which are more soluble in water than lactose through use of lactase enzyme. In such a process the lactase-sucrose preparation of this invention may be added to the milk, which is then incubated at an elevated temperature until the desired amount of hydrolysis has taken place.

In Example 1, Part A illustrates a method of preparing the lactase yeast, Part B illustrates the process of this invention, and Part C illustrates a use of the process and product of this invention.

*Example 1*

PART A.—PREPARATION OF LACTASE YEAST

A clean, sound yeast whey was adjusted to a pH of 4.5 either by ripening to an acidity of 0.5% with a lactic acid producing organism or by the addition of lactic acid. Ammonia water or ammonium phosphate and 7.5 grams of lactose per 100 grams of whey were then added as an enriching nutrient material. The whey was pasteurized by heating to 185° F. for at least one minute and then cooled and held at a pasteurizing temperature of 145° F. until cultured by the yeast organism. Just prior to culturing, any coagulated protein in the whey was removed by decantation. The yeast of choice in this process is *Saccharomyces fragilis* Jorgensen. This yeast is a major constitutent of Kefir and Kumiss food preparations which have been used by man for centuries.

The clear supernatant deproteinated whey was cooled to 86° F. and pumped into the fermentor continuously. In the fermentor the temperature was maintained at 86° F., and pH at 4.5, and aeration was supplied at a rate to provide maximum growth of *S. fragilis*. At the end of 8 to 10 hours, the fermentation was complete and the liquor was pumped to a yeast centrifuge where the yeast cells were recovered as a cream. This cream was washed twice with water and may then be spray dried directly, or tray dried. If the material is tray dried, the yeast cream is first pumped through a filter press and a yeast cake is obtained which is then extruded in long thin strings onto trays and may then be dried, ground and packaged.

PART B.—ISOLATION AND PURIFICATION OF LACTASE FOR A LACTASE-SUCROSE PREPARATION

The dried *Saccharomyces fragilis* yeast was suspended in water in an agitator such as a rotary drum. A small amount of toluol was added as a preservative. A mixture of potassium hydrogen phosphate and potassium dihydrogen phosphate was used in the mixture to adjust the pH thereof to about 7.1. The extraction was carried out at about 25° C. and was complete in approximately 18 hours. A 10% slurry of the yeast in the phosphate buffer gave a desirable extraction.

After the extraction was complete, the yeast slurry was centrifuged to remove the yeast cells and other debris and to obtain a centrifugate containing the lactase enzyme.

The centrifugate was cooled to a temperature of approximately 40° F. in a chilled tank and acetone at 40° F. added thereto until the acetone concentration was about 50% by weight in order to precipitate the lactase containing material. The precipitation of lactase was complete within approximately 2 hours. The lactase was then separated by centrifugation.

The precipitate containing the lactase was then dissolved in water in a suitable tank to provide a suspension having a total solids content of about 8% and centrifuged. To the centrifugate there was added a sucrose carrier to bring the final solids content thereof to about 15%. The lactase-sucrose dispersion was then spray dried at an air inlet temperature of 260° F. and an air outlet temperature of 180° F. to yield a lactase preparation.

PART C.—THE PREPARATION OF FROZEN CONCENTRATED MILK

Condensed skim milk at 31% solids content was pasteurized at 160° F. for 30 minutes, cooled to 105° F., and one part of the lactase-sucrose preparation immediately added to each 40 parts of lactose present in the milk. The condensed skim milk was held at 105° F. for 4 hours, at the end of which time from 70% to 90% of the lactose had been hydrolyzed by the enzyme. The mixture was immediately heated to 145° F. and held at this temperature while a test for a degree of lactose hydrolysis was being completed.

The hydrolyzed milk was then mixed with the unhydrolyzed whole milk concentrate and cream to give a final product containing 15% hydrolyzed lactose and 35% total solids of the desired fat to solids ratio. This modified whole milk concentrate was then pasteurized at 155° F. for 30 minutes, homogenized at 2,500 pounds per square inch, cooled to 40° F., packaged and placed in a 20° F. hardening room until completely frozen.

A further example of the process of this invention utilizing *Torulopsis sphaerica* as the lactase yeast source is set forth below in Example 2.

*Example 2*

A dried *Torulopsis sphaerica* yeast was suspended in water in an agitator such as a rotary drum. A small amount of toluol was added as a preservative. A mixture of potassium hydrogen phosphate and potassium dihydrogen phosphate was used in the mixture to adjust the pH thereof to about 7.1. The extraction was carried out at about 25° C. and was complete in approximately 18 hours. A 10% slurry of the yeast in the phosphate buffer gave the desirable extraction.

After the extraction was complete, the yeast slurry was centrifuged to remove the yeast cells and other debris and to obtain a centrifugate containing the lactase enzyme.

The centrifugate was cooled to a temperature of approximately 40° F. in a chilled tank and acetone at 40° F. added thereto until the acetone concentration was about 50% by weight in order to precipitate the lactase containing material. The precipitation of lactase was complete within approximately 2 hours. The lactase was then separated by centrifugation.

The precipitate containing the lactase was then dissolved in water in a suitable tank to provide a suspension having a total solids content of about 8% and centrifuged. To the centrifugate there was added a sucrose carrier to bring the final solids content thereof to about 15%. The lactase-sucrose dispersion was then spray dried at an air inlet temperature of 260° F. and an air outlet temperature of 180° F. to yield a lactase preparation.

Various modifications and changes may be made in the process and preparation described herein without sacrificing any beneficial results obtained thereby nor departing

We claim:

1. A process for the isolation and purification of lactase from a dried lactase yeast which comprises agitating a dried lactase yeast in an aqueous potassium phosphate buffer solution having a solids content of about 5% to 15% at a pH within the range from about 6.5 to 7.2 and a temperature of less than about 40° C. for about 4 to 20 hours, centrifuging a lactase solution from the resulting slurry, cooling the lactase solution to about 40° F. and adding acetone at about 40° F. to said lactase solution until the acetone concentration is about 40 to 50% by weight to precipitate the lactase, centrifuging the lactase from said solution, suspending the lactase in water to a concentration of about 8% total solids, centrifuging, and adding a sucrose carrier to the centrifugate to bring the final solids content thereof to about 12% to 20% and spray drying said resulting lactase-sucrose dispersion at a temperature of about 175° F. to 265° F., whereby a spray-dried lactase-sucrose preparation is obtained having high lactase activity, high stability, and excellent flavor in milk products.

2. A process as set forth in claim 1 wherein said aqueous potassium phosphate buffer solution has a solids content of about 10%.

3. A process as set forth in claim 1 wherein the temperature of said aqueous potassium phosphate buffer solution is in the range from about 25° C. to 40° C.

4. A process as set forth in claim 1 wherein the final solids content of said lactase-sucrose dispersion is about 15%.

5. In a process for the isolation and purification of lactase from a lactase yeast, the steps of suspending a purified lactase in water to a concentration of about 8% total solids, centrifuging and adding a sucrose carrier to the centrifugate to bring the final solids content thereof to about 12 to 20%, and spray drying said resulting lactase-sucrose dispersion at a temperature of about 175° F. to 265° F., whereby a spray-dried lactase-sucrose preparation is obtained having high lactase activity, high stability, and excellent flavor in milk products.

6. A process as set forth in claim 5 wherein the final solids content of said lactase-sucrose dispersion is about 15%.

7. A lactase preparation having high lactase activity, high stability and excellent flavor in milk products consisting of homogeneous spray-dried particles of lactase and sucrose.

References Cited in the file of this patent

UNITED STATES PATENTS

| | | |
|---|---|---|
| 1,474,542 | Monrad | Nov. 28, 1923 |
| 1,855,591 | Wallerstein | Apr. 26, 1932 |
| 2,715,601 | Morgan | Aug. 16, 1955 |